3,778,366
PROCESS FOR TREATMENT OF AQUEOUS
SUSPENSIONS
Kurt A. Kraus, Oak Ridge, Tenn., assignor to the United States of America as represented by the United States Atomic Energy Commission
No Drawing. Filed May 28, 1971, Ser. No. 148,132
Int. Cl. B01d 13/00
U.S. Cl. 210—23                                       3 Claims

ABSTRACT OF THE DISCLOSURE

A method of treating aqueous waste streams for the purpose of removing a soluble or dispersed moiety which comprises passing said stream through a vertically disposed, porous, permeable material which contains a zone of fluidization and a solid fluidizing medium in said zone at a velocity sufficient to affect transpiration of a purified water product through said material.

Background of the invention

The invention described herein was made in the course of, or under, a contract with the U.S. Atomic Energy Commission.

The present invention relates to an improvement in clarifying aqueous suspensions by filtration or hyperfiltration. A major application for this invention lies in the treatment of aqueous sewage effluents. A typical sample of aqueous sewage effluent contains approximately 700 parts per million (p.p.m.) dissolved salts, 20 p.p.m. biological-oxygen-demanding agents, and 20 p.p.m. suspended matter. In order to convert such an effluent to biologically acceptable potable water, it is necessary to remove the suspended matter and the biological-oxygen-demanding agents as well as the salt level to below the maximum human tolerance limit. One of the processes used for dealing with the organic matter is to sorb it onto activated carbon and remove the sorbent by sedimentation in large tanks. However, because of the small size of the carbon particles it is necessary to add a flocculating agent to effect coalescence of the particles so as to promote sedimentation. While technically effective, the process is economically unattractive because of the large amounts and high cost of flocculating agent, large water holdup, and because it is essentially a batch process.

A recent process innovation suggested for effecting purification of aqueous sewage effluents by carbon sorption in a continuous manner involves circulation of pressurized aqueous carbon slurry through a closed system containing a horizontally positioned porous hose through which purified liquid transpires. Because the direction of filtration is normal to the axial velocity of the slurry through the base, the process has been termed "cross-flow filtration."

The apparent advantage of continuous operation of cross-flow filtration in clarifying slurries has not, in some cases, been successful. It has been found that, unless cross-flow filtration proceeds at high fluid velocities, a thin, solid, caked layer formed from the solid phase of the slurry builds up on the surface of the hose, which has the effect of reducing the filtration or transpiration rate to an impractically low level. Reduction in filtration rises in proportion to the cake thickness. If the cake is readily compressible, an increase in pressure results in further decreased filtration. When the high-resistance cake is manually removed from the surface of the hose, the filtration rate has been found to increase as much as fourfold.

SUMMARY OF THE INVENTION

To maximize the benefits of cross-flow filtration, it is an object of this invention to provide a method for continuous removal of the surface cake or surface film which builds up on the filter during cross-flow filtration of a slurry at a minimal fluid velocity with or without a salt-rejecting membrane deposited on the filter. The invention comprises a method of treating aqueous waste streams for the purpose of removing a soluble or dispersed moiety which comprises passing said stream through a vertically disposed, porous, permeable material which contains a zone of fluidization and a solid fluidizing medium in said zone at a velocity sufficient to affect transpiration of a purified water product through said material.

I have found that cake buildup can be effectively eliminated if cross-flow filtration is allowed to take place in a vertically disposed permeable filter hose in the presence of a fluidized bed of solid abrasive particles which have the capacity to remove the bulk of any deposited solid cake.

The following examples illustrate the value of including a fluidized bed of solid particles in the context of cross-flow filtration and in a hyperfiltration process, respectively.

Example I

The effectiveness of operating a vertical cross-flow arrangement with a fluidizing bed can be demonstrated by relating the results of two parallel experiments. In one case, a slurry containing activated carbon was passed upwards through a porous permeable fire hose made of synthetic fiber at a radial pressure drop in the range 20–60 p.s.i.g., a carbon concentration in the range 0.025 to 0.75 weight percent, and at an axial open channel (i.e., no fluidized bed) velocity of from 3 to 24 ft./sec. The hose was woven from 10/16 warp yarn of 0.050 inch diameter and a fiber yarn of 0.034 inch diameter with 9¼ filler picks per inch. The hose had a pressure rating of 400 lbs./in.². The results showed that transpiration fluxes of 354 gallons per day per square foot (g.p.d./ft.²) could only be produced at carbon concentrations in the range .025 to .075 percent and if a velocity of at least 20 ft./sec. was maintained. When either the carbon concentration or liquid velocity was lower, appreciable buildup of a carbon cake was deposited on the material matter of the hose with concomitant reduction in transpiration flux. On the other hand, when a fluidized bed was operated during vertical cross-flow filtration, there was no cake buildup. Maximum transpiration fluxes could be attained at velocities that would be inoperable in the absence of a fluidized bed. For example, using an aqueous slurry feed comprising an aqueous sewage effluent containing 0.075 percent activated carbon, transpiration fluxes of 1 cm./min. were achieved, with little to no carbon cake buildup, at pressures between 5 and 20 p.s.i. and at fluidization velocity of from less than 1 to no more than about 2 ft./sec., depending on the density of the fluidizing medium. Thus, I show that a satisfactory transpiration flux can be achieved at a reduced axial flow velocity by employing a fluidizing medium in a vertically oriented cross-flow filtration arrangement. The large reduction in axial flow velocity which can be achieved with fluidized beds make this technique attractive, not only because of the apparent great savings in pumping energy, but because the length of the plants can also be greatly decreased.

Throughout the foregoing experiment the quality of the transpired water was excellent. The product water was clear to the eye at all times. Turbidity as measured by a Hach turbidimeter gave values in the range 0.05 to 0.15 Jackson Turbidity Units. The organic content of the water product was 2 p.p.m. or less as measured by a Bachman total carbon analyzer.

The advantages of this invention can also be realized by employing a fluidizing medium in a hyperfiltration or reverse-osmosis process. From an operational point of view, cross-flow filtration and hyperfiltration can be effected in similar apparatus. The differences are that, in order to remove salts and/or low-molecular-weight materials from solutions by hyperfiltration, higher pressures are required, several hundred p.s.i. and higher, while including a material capable of forming a salt-rejecting membrane on the surface of the hose. Such materials are well known and are described in Principles of Desalination, Academic Press, Inc., 1966, Chapter 8. In the context of a hyperfiltration process, I have found that a fluidized bed in highly effective in reducing concentration polarization. The turbulent action of the fluidized particles apparently serves to reduce salt concentration (termed "concentration polarization") which occurs at the interface between the dynamically formed salt-rejection membrane and the feed solution. The term "concentration polarization" is usually used to describe the salt or solute buildup which occurs during hyperfiltration at the feed side of the membrane. If the membrane rejects salt, it must accumulate at the interface. This concentration polarization is undesirable for a variety of reasons. The most important ones are: (a) product quality decreases because the membrane, which now sees a higher salt concentration, will let more salt pass through it, (b) filtration pressures have to be increased to override the added osmotic pressure at the feed side of the membrane, and (c) scaling at the membrane may occur if the interfacial concentrations are high enough to exceed solubility limits.

Example II

The effect of using a fluidized bed in a hyperfiltration operation was tested by passing an aqueous feed containing 0.05 M $Na_2SO_4$ and polyacrylic acid. The vertically mounted experimental arrangement consisted of a porous metal tube surrounded by a glass tube of large diameter to define as annulus with the metal tube. Bed material placed in the annulus was supported by a screen at the bottom end and restrained from passing beyond the fluidization zone by a screen at the top end of the annulus. Aqueous feed was passed through at a hyperfiltration pressure level and at a velocity sufficient to effect fluidization. The results obtained with a fluidized bed are summarized in Table I below.

TABLE I.—HYPERFILTRATION WITH FLUIDIZED BEDS 0.05 M $Na_2SO_4$, poly(acrylic acid) dynamic membrane on millipore filter with a porous stainless steel support, pressure ~400 p.s.i.

| Bed materials | Particle size, mesh | Flux, cm./min. | Cross-flow velocity, ft./sec. | Percent rejection observed (maximum) | |
|---|---|---|---|---|---|
| | | | | Carbon | Salt |
| Glass beads | 170 | 0.08 | 0.007 | 93 | 62 |
| Lead granules | 20–100 | 0.04 | 0.30 | 86 | 76 |
| Aluminum oxide | 50–70 | 0.05 | 0.03 | | 67 |
| Stainless steel | 70–100 | 0.05 | 0.03 | 91 | 77 |
| Do | 100–170 | 0.05 | 0.03 | 91 | 75 |
| Do | 270–325 | 0.05 | 0.01 | 89 | 74 |

In the absence of fluidized beds, a salt rejection of about 15–30% was obtained by circulating the aqueous feed within the indicated range of cross-flow velocities.

The advantages of conducting a hyperfiltration process with a fluidized bed as compared to the same process without a fluidized bed are also illustrated in the compendium of data shown in Table II below.

TABLE II.—EFFECT OF FLUIDIZED BED ON HYPERFILTRATION (1,000 p.s.i.g.; 0.5 M NaCl; 0.45μ ACROPOR¹ SUPPORT)

| Membrane | Type of fluidized bed | Circ. vol., ft./sec. | R~obs percent | Flux, g.p.d./ft.² | A<br>Equiv. circ. vel., open channel | B<br>R~obs percent, w./open channel, same circ. vel. as w./fluid. bed |
|---|---|---|---|---|---|---|
| Hydrous Zr(IV) oxide—PAA ² | #12 lead shot | 0.33 | 67 | 80 | 6.2 | |
| Do | 25–50 mesh stainless steel | 0.25 | 59 | 78 | | 10–15 |
| Do | 70–100 mesh stainless steel | 0.09 | 55 | 64 | 3.6 | 5 |
| Do | 0.03 mesh stainless steel | 0.23 | 38 | 220 | 4 | 4 |
| Dowex 50-XO.5 ³ | 70–100 mesh stainless steel | 0.10 | 32 | 230 | 3.5 | |
| Hydrous Zr(IV) oxide | 20–50 mesh stainless steel | 0.25 | 30 | 190 | 4 | 2.5 |

¹ A filter aid material obtainable from Gelman Instrument Company, Ann Arbor, Mich.
² PAA=Polyacrylic acid.
³ A sulfonated cation exchange resin (polystyrene cross-linked with divinyl benzene).
NOTE.—R~obs=1−Cw/Cf, where R~obs=observed rejection; Cw=concentration of impurity in transpired product solution; and Cf=concentration of impurity in feed (untranspired) solution.

There are two points of comparison to be noted. The first is that the feed circulation velocity needed to obtain a given rejection rate without a fluidized bed is, in all cases, at least an order of magnitude higher than the velocity needed for fluidization [see column A, where the equivalent open channel (i.e., no fluidized bed) circulation velocity is tabulated]. The second point of comparison is evident from the data of column B in which is tabulated the rejection that is obtained if fluidizing velocities were employed in the absence of a fluidized bed.

In summary, therefore, it has been shown that the use of a fluidizing medium in conjunction with cross-flow filtration or hyperfiltration results in a considerable reduction in the fluid velocity needed to achieve effective transpiration in batch processes. The advantage of the fluidized bed is realized even where the columns are as much as 30° deflected from the vertical. The pumping energy needed to achieve an effective transpiration rate is that which is sufficient to effect fluidization of the particles comprising the fluidizing medium. The effectiveness of the fluidizing medium depends on the ability of the particles to create a zone of turbulence where buildup of solidified cake occurs in cross-flow filtration or to reduce concentration polarization in hyperfiltration. The choice of particles is mainly a function of their density for cross-flow filtration in order to sweep away the deposited filter cake. In hyperfiltration, the need is for turbulence so as to reduce or eliminate concentration polarization fouling effects. The choice of fluidizing medium may be made from a variety of materials such as glass beads, sand particles, metal particles of generally spheroidal shape with a generally irregular surface to maximize turbulence.

What is claimed is:

1. A method of treating aqueous waste streams for the purpose of removing a soluble or dispersed solute moiety which comprises passing said stream at a velocity in the range 0.007 to 2 feed per second through a vertically disposed, porous, permeable material which contains a zone of fluidization while maintaining a solid fluidizing medium in said zone to fluidize said medium in said zone and to effect transpiration of a purified water product through said material.

2. The method according to claim 1 which the fluidizing medium is selected from the group consisting of glass beads, sand particles, and metal particles having an irregular surface.

3. The method according to claim 1 in which the material is a hyperfiltration membrane.

References Cited

UNITED STATES PATENTS

| | | | |
|---|---|---|---|
| 3,462,362 | 8/1969 | Kollsman | 210—23 |
| 3,541,006 | 11/1970 | Bixler et al. | 210—353 X |
| 3,373,056 | 3/1968 | Martin | 210—23 |
| 3,425,562 | 2/1969 | Hamer | 210—353 X |
| 3,552,574 | 1/1971 | Lowe et al. | 210—353 |

FRANK S. SPEAR, JR., Primary Examiner

U.S. Cl. X.R.

210—321, 353